(12) United States Patent
Jimenez

(10) Patent No.: US 6,553,158 B1
(45) Date of Patent: Apr. 22, 2003

(54) TUNABLE RESONATOR HAVING A MOVABLE PHASE SHIFTER

(75) Inventor: Jose Luis Jimenez, Ann Arbor, MI (US)

(73) Assignee: LNL Technologies, Inc., Cambridge, MA (US)

( * ) Notice: Subject to any disclaimer, the term of this patent is extended or adjusted under 35 U.S.C. 154(b) by 0 days.

(21) Appl. No.: 09/718,673

(22) Filed: Nov. 22, 2000

Related U.S. Application Data

(60) Provisional application No. 60/167,443, filed on Nov. 23, 1999.

(51) Int. Cl.[7] ................................................. G02B 6/26
(52) U.S. Cl. ................. 385/15; 385/3; 385/24; 385/36; 385/39
(58) Field of Search .......................... 385/15, 24, 27, 385/36, 39, 1, 2, 3

(56) References Cited

U.S. PATENT DOCUMENTS

| | | | | |
|---|---|---|---|---|
| 5,477,555 A | * | 12/1995 | Debeau et al. | 372/25 |
| 6,009,115 A | * | 12/1999 | Ho | 372/92 |
| 6,125,220 A | * | 9/2000 | Copner et al. | 385/27 |
| 6,289,151 B1 | * | 9/2001 | Kazarinov et al. | 385/32 |

* cited by examiner

Primary Examiner—John D. Lee
Assistant Examiner—Jennifer Doan
(74) Attorney, Agent, or Firm—Edwards & Angell, LLP

(57) ABSTRACT

An optical resonator having a non-continuous waveguide having first and second confrontingly opposite end faces between which is defined a region and having a continuous optical path defined through the waveguide. The optical resonator can be tuned to a particular resonant wavelength by providing a phase shifter in the region between the first and second end faces and positioning the phase shifter so as to introduce a phase shift in an optical signal propagating through the waveguide and along the optical path. A method for effecting such a phase shift.

16 Claims, 9 Drawing Sheets

TUNABLE RESONATOR HAVING A
MOVABLE PHASE SHIFTER

CROSS-REFERENCE TO RELATED APPLICATION

This application claims priority to Provisional Patent Application No. 60/167,443, filed on Nov. 23, 1999.

FIELD OF THE INVENTION

The present invention is directed to a semiconductor optical resonator having a non-continuous waveguide and a phase shift element selectively movable into and out of an optical path defined through and by the resonator.

BACKGROUND OF THE INVENTION

Optical resonators are of great interest in the telecommunication industry because of their ability to couple specific wavelengths from a multi-wavelength optical signal (e.g., WDM, DWDM, UDWDM, etc.) and route those wavelengths to a desired destination. A typical optical cross-connect includes input and output waveguides arranged so that a portion of each of the waveguides is disposed adjacent to a resonator. A desired wavelength of a multi-wavelength optical signal propagating in an input waveguide may be coupled to a particular output waveguide by providing a resonator tuned or tunable to that desired wavelength. Other wavelengths in the optical signal not on-resonance with a particular resonator will continue to propagate through and along the input waveguide and may ultimately be output therefrom. Consequently, a resonator can serve as a wavelength-specific routing device which guides particular wavelengths of light from an input path to one of several output paths.

The resonant wavelength for a circular resonator may be determined using equation (1):

$$\lambda = \frac{2\pi Rn}{m} \quad (1)$$

In equation 1 R is the resonator's radius, n is the effective index of refraction of the optical signal, and m is an integer of value 1 or greater.

If the resonator is not circular, the resonant wavelength is given by the equation (2):

$$\lambda = \frac{Ln}{m} \quad (2)$$

In equation 2 L is the resonator's length, n is the effective index of refraction of the optical signal, and m is an integer of value 1 or greater.

Today resonators are frequently employed as part of the cross-connect architecture of optical networks, such as depicted in FIG. 14. Resonators are especially well-suited for use in optical data and tele-communication systems such as, for example, DWDM systems. These systems efficiently transmit data by simultaneously transmitting a plurality of wavelengths of light over a single optical fiber or waveguide and then, selectively coupling a desired wavelength from the multi-wavelength signal at a desired location and routing that wavelength to a desired destination.

Cross-connect waveguide architecture is described in International Patent Appln. No. WO 00/50938, entitled "Vertically Coupled Optical Resonator Devices Over a Cross-Grid Waveguide Architecture".

For example, and as depicted in FIG. 14, a M×N optical cross-connect 35 provides a plurality of input waveguides 37 ($M_1$ and $M_2$), a plurality of resonators 41, and a plurality of output waveguides 39 ($N_1$, $N_2$, and $N_3$). Each resonator 41 may be tuned (or tunable) to a desired wavelength (i.e., an on-resonance wavelength) and thus couple only that wavelength from the multi-wavelength optical signal propagating in and through either input waveguide 37. That wavelength is then coupled from the resonator 41 to the corresponding output waveguide 39. Off-resonance wavelengths are not coupled and thus continue to propagate through the input waveguide 37.

Each of the input waveguides 37 may receive and transmit an optical signal from/to a long-distance transmission medium (e.g., a fiber-optic cable). Similarly, each of the output waveguides 39 may connect to a long-distance transmission medium. For example, each of the output waveguides 39 may connect to a fiber-optic cable over which an optical signal having a single wavelength may propagate.

Since the different wavelengths provided in the multi-wavelength optical signal are intended for different destinations, it is necessary to separate and suitably route each of those different wavelengths as separate and distinct optical signals. Resonators 41 perform this routing function quickly and efficiently—since each resonator 41 can couple a particular wavelength of light traveling in an input waveguide 37 to an output waveguide 39.

If the resonators used in a cross-connect can only separate out a single wavelength of light, it will be necessary to provide the cross-connect with M×N resonators. However, if the resonators can be tuned sufficiently, each of the resonators could be selectively tunable to a plurality of wavelengths, thereby eliminating the need for some resonators and simplifying the cross-connect structure.

It will be appreciated that the terms "input" and "output" are used for convenience, and that light could be transmitted in the opposite manner, that is, from the "output" waveguide to the "input" waveguide.

To be useful to the telecommunication market, resonators should meet two basic requirements: small size; and high tunability range.

Small size is desirable for two reasons. First, small resonators require less wafer real estate, which reduces costs. Second, small resonators have large free spectral range (FSR) characteristics, as is clear from equation 2:

$$FSR = \lambda \frac{\lambda}{(2\pi Rn)} \quad (3)$$

where λ is the wavelength of the optical signal, R is the radius of the resonator and n is the effective refractive index of the medium through which the optical signal propagates (i.e., the resonator material). Referring to FIG. 16A, the FSR of a resonator having a 10 μm radius is graphically depicted. Such a resonator has a FSR that accommodates approximately twenty-five 200 GHz channels in an optical signal transmitted at a wavelength of 1550 nm. In contrast, a resonator having a radius of 40 μm has a FSR that accommodates approximately six 200 GHz channels, as depicted in FIG. 16B. A large FSR may be preferred because it allows for a higher number of optical channels to be multiplexed in a single fiber, resulting in better utilization of the fiber optical bandwidth.

Resonator operation can be enhanced if the resonator's resonant wavelength can be varied, i.e., a tunable resonator, as that enables selective modification of the resonator's switching behavior. Since the resonant wavelength of a resonator is related to the material from which the resonator is constructed, and to its index of refraction, changing the resonator index of refraction yields a corresponding change in the resonator resonant wavelength.

Increased resonator tunability is generally desirable because it provides a network administrator with the opportunity to reconfigure the network on the fly (without interrupting service) according to usage considerations and the demands of their clients. For example, and with reference to FIGS. 15A and 15B, any resonator in an optical crossconnect may be selectively tuned to a desired resonant wavelength. As depicted in FIG. 15A, the left-most resonator (in the figure) may be tuned to wavelength $\lambda_2$, and right-most resonator to wavelength $\lambda_1$. That configuration may be selectively changed, as desired, so that the left-most resonator (in the figure) may be tuned to wavelength $\lambda_1$, and the middle resonator to wavelength $\lambda_2$, as depicted in FIG. 15B.

Resonator tunability is important for another reasons. Using currently available semiconductor fabrication processes and techniques, resonators cannot easily be manufactured with the dimensional precision required to insure that the resonators perform as required. Resonator size is important because as explained below a resonator's radius directly affects the resonator's resonant wavelength, and, at least for telecommunication applications, resonator wavelength is strictly specified by the ITU grid, a telecommunication standard which specifies a plurality of optical channels that are typically separated by fractions of a nanometer. Dimensional variations caused by the resonator manufacturing process may cause resonators to have resonant wavelengths that do not meet the ITU grid requirements. For example, a 10 nm variation for a nominal 10 $\mu$m radius resonator (and this presses the limits of what can be achieved using optical lithography), results in a resonant wavelength which deviates by 1.55 nm from the intended resonant wavelength. A deviation of this magnitude is not desirable, and in fact, may not even be acceptable in current telecommunication networks.

Such manufacturing variations might, however, be tolerable if the resonator could be tuned sufficiently to compensate for such manufacturing variations. Known tuning techniques, which are discussed in more detail above, do not permit sufficient tuning to compensate for all such manufacturing variations.

There are several ways to change a resonator's index of refraction and so control the resonator's operating wavelength, including thermally, by current injection, and by the electro-optic effect, each altering the resonator's index of refraction and thus optical length. All of these techniques, however, have limitations.

For thermal tuning, the resonant wavelength shift may be determined using the following equation:

$$\Delta\lambda = \lambda \frac{\Delta n \Delta R}{nR} \quad (4)$$

where $\Delta\lambda$ represents the shift in resonant wavelength, $\lambda$ represents the resonator's nominal resonant wavelength, n represents the resonator's index of refraction, $\Delta n$ represents the change in the resonator's index of refraction, R represents the resonator's nominal radius at a given temperature, and $\Delta R$ is the change in the resonator's radius induced by a temperature change.

In accordance with equation (3), the optical resonance wavelength is a function of both the resonator geometry and the waveguide refractive index. Consequently, there are several techniques by which a resonator may be tuned. By way of example, to change the resonance wavelength, either the index of refraction or the physical optical path length (given in Equation 1 as n and R, respectively) can be altered.

The index of refraction of the waveguide material can be altered by changing the waveguide's temperature (thermal tuning), injecting current (current tuning) into the waveguide, or applying voltage to the waveguide (electro-optic tuning).

Thermal tuning is discussed in Rafizadeh, D., et al., "Temperature Tuning of Microcavity Ring and Disk Resonators at 1.5-$\mu$m", IEEE publication number 0-7803-3895-2/19 (1997).

In the case of either current injection or electro-optical tuning, the resulting change in resonance wavelength is:

$$\Delta\lambda = \lambda\left(\frac{\Delta n}{n}\right) \quad (5)$$

Again, $\lambda$ is the wavelength of the optical signal, $\Delta n$ is the change in the resonator material's index of refraction, and n is the effective index of refraction of the resonator material.

A common semiconductor waveguide construction for implementing either current injection or electro-optic tuning involves doping the upper cladding with p-type dopant, the waveguide core with low or intrinsic dopant, and the lower cladding and substrate with n-type dopant. If electric contact is made to the upper (p-type) and lower (n-type) waveguide layers, the resulting p-i-n junction may then be operated in forward- or reverse-bias mode. Under forward bias, a change in the index of refraction of the waveguide core may be induced through current injection. Under reverse bias, a high electrical field can be formed across the intrinsic waveguide core and a refractive index change can result through the electro-optic effect. Both of these effects provide only a relatively small tuning effect.

Control over the resonator resonant wavelength using any of the above-described methods is limited, and may not provided sufficient tunability to account for possible manufacturing variations affecting the resonator size (i.e., radius).

It will be understood that tuning using these methods generally yields tuning ranges below 1 mn.

Consequently, while tuned and tunable resonators are generally known, there exists a need in the art for a tuned and/or tunable resonator that is relatively small in size and which can be tuned across a wider range of wavelengths. More particularly, there is a need for a resonator that can be tuned such that the resonator's operating wavelength varies by at least approximately an order of magnitude more than the 1 nm tuning range currently achievable.

SUMMARY OF THE INVENTION

The present invention is directed to a method of tuning a resonator and to a tunable resonator having a non-continuous waveguide having first and second confrontingly opposite end faces between which is defined a region. A continuous optical path is defined through the waveguide and across the region. A phase shifter is provided that is selectively movable in the region into and out of the optical path. When located in the optical path, the phase shifter introduces a phase shift in an optical signal propagating through the waveguide and along the optical path.

The invention accordingly comprises the features of construction, combination of elements, and arrangement of parts which will be exemplified in the disclosure herein, and the scope of the invention will be indicated in the claims.

BRIEF DESCRIPTION OF THE DRAWINGS

In the drawing figures, which are not to scale, and which are merely illustrative, and wherein like reference characters denote similar elements throughout the several views:

FIG. 6C top plan view of a stepped variable phase shift element constructed in accordance with an alternate embodiment of the present invention;

DETAILED DESCRIPTION OF THE PRESENTLY PREFERRED EMBODIMENTS

Figure 1:
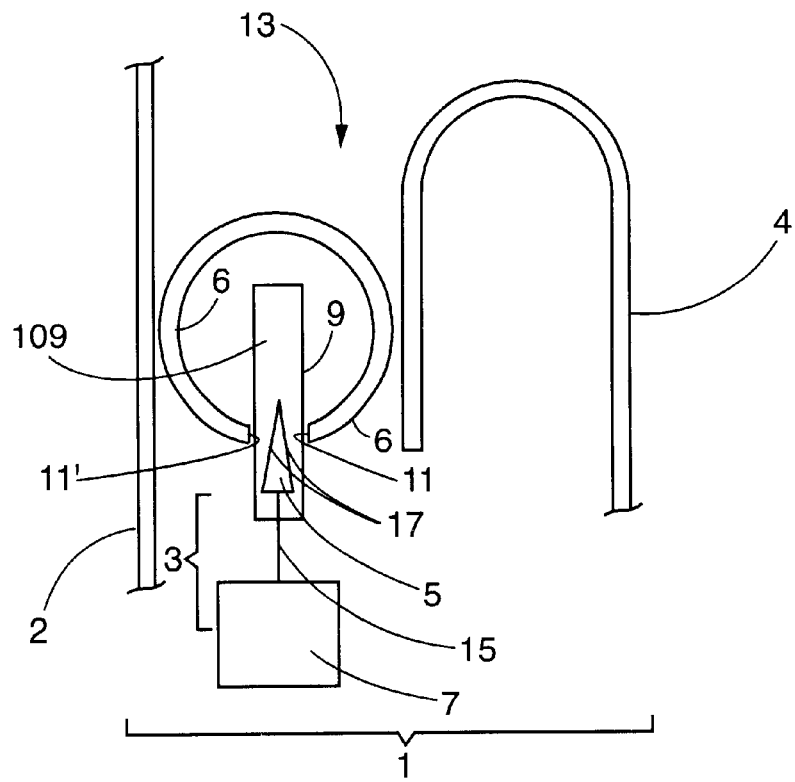
FIG. 1 is a top plan view of an optical device having a tunable resonator constructed in accordance with the present invention.

As used herein, the terms "light signal" and "optical signal" are used interchangeably, and may include signals such as WDM, DWDM, UDWDM signals, and the like. The terms "light", "light signal" and optical signal" are intended to be broadly construed and to refer to visible, infrared, ultraviolet light, and the like.

A resonator in accordance with this invention, by virtue of the minute scale of its components, can be characterized as a MEMS (micro-electro-mechanical system) device—many of the resonator's parts have dimensions measured in microns ($\mu$m). By virtue of its speed, the resonator is particularly suited for use in controlling light guided by and within optical waveguides.

The present invention is directed to a new type of resonator that uses a phase shifter to vary the resonator resonant wavelength and to increase the resonator's wavelength tuning range by at least one order of magnitude beyond what is presently achievable. In one embodiment of the present invention, and with initial reference to FIGS. 1–3, an optical device 1 includes a resonator 13 constructed of a non-continuous waveguide 6 having first and second confrontingly opposite end faces 11, 11' between which is defined a region 9. End faces 11, 11' are exposed by region 9 and are oriented such that when light propagates through the resonator 13, it will exit via one end face 11, crosses the region 9 (and pass through the phase shift element 5 if it is located in the region 9), and reenter the resonator 13 through the other end face 11'.

While preferred arrangements of the tunable resonator 13 of the present invention are described in detail below, it will be appreciated from the disclosure provided herein that other configurations are also contemplated by and within the scope and spirit of the present invention.

The resonator 13 of the present invention differs from conventional resonators in that it includes a phase shifter 3 which enables user-selected variation of the optical path length (generally defined herein as the round-trip length experienced by an optical signal propagating in and through the resonator 13) of the resonator 13. Selective movement of the phase shift element 5 into and out of the optical path, i.e., into and out of the region 9, provides a highly tunable resonator 13 having a tunability range exceeding that of conventional optical resonators.

Figure 4A:
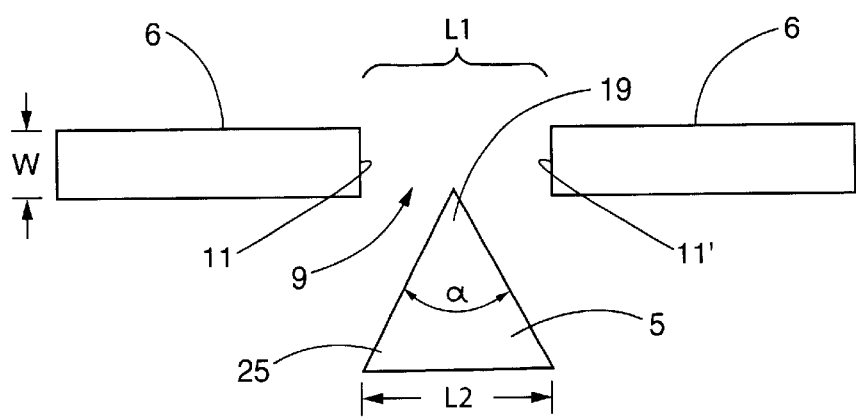
FIGS. 4A and 4B are schematic views showing, respectively, a phase shift element positioned out of and in an optical path defined by a resonator.
Figure 4B:
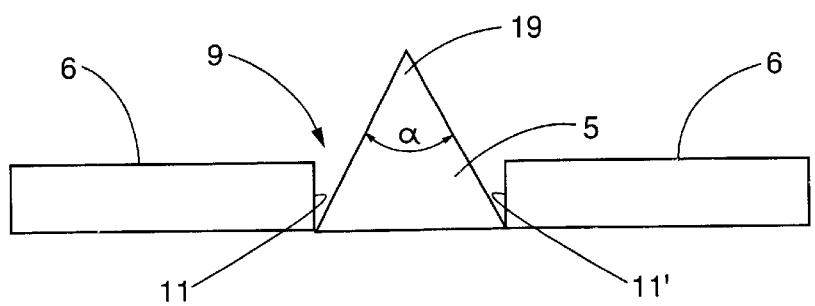
Figure 11:
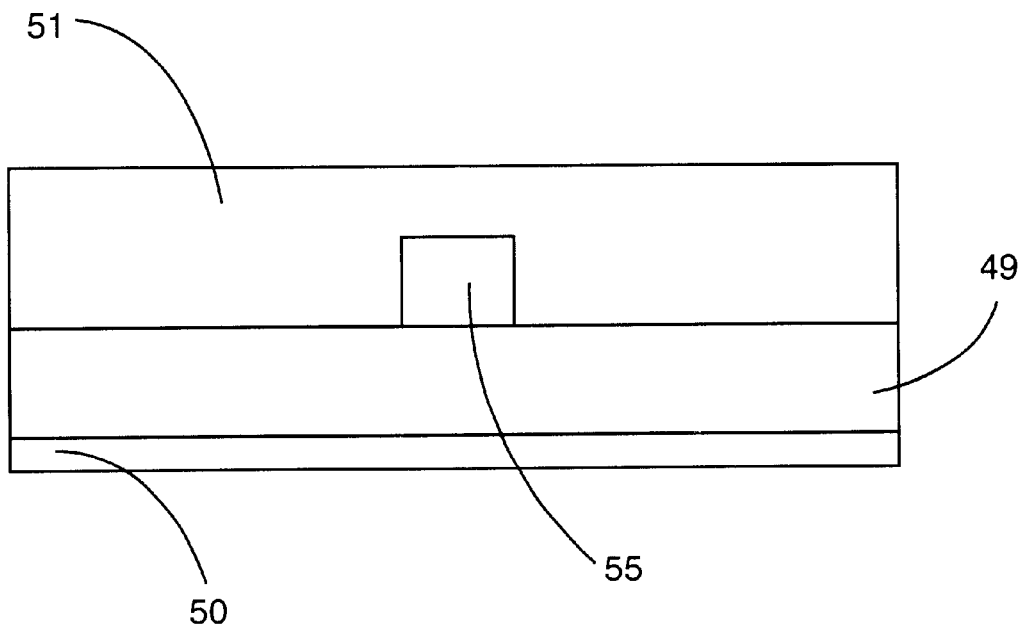
FIG. 11 is a front cross-sectional view of a portion of a waveguide as viewed along line 10—10 in FIG. 3.

A continuous optical path defined through the resonator 13 (i.e., through the core 55 of the waveguide 6, see, e.g., FIG. 11) extends across the region 9. A phase shifter 3 including a phase shift element 5 connected to an actuator 7 via a link 15 is provided as part of the resonator 13. The phase shift element 5 is selectively movable in the region 9 into and out of the optical path, in a direction generally indicated by arrow A of FIG. 2. When the phase shift element 5 is positioned in the optical path, as depicted in FIGS. 1 and 4B, an optical signal passing through the phase shift element 5 will experience a phase shift because the optical properties of the phase shift element 5 are different than those of the resonator 13, as discussed in more detail below. When the phase shift element 5 is out of the optical path, as depicted in FIG. 4A, no material phase shift is introduced in the optical signal (should a minor phase shift arise because the index of refraction of region 9 differs from the index of refraction of waveguides 6, a compensating element could be included in the optical path). The phase shift element 5 may be caused to move generally parallel with a plane defined by a bottom surface 109 of the region 9 or, alternatively, in a direction generally non-parallel with the bottom surface 109 (in a direction other than that indicated by arrow A), as a routine matter of design choice. Movement of the phase shift element 5 need only be into and out of the optical path, in accordance with the various embodiments of the present invention. Phase shift element 5 may be caused to move in any other direction which guides it into and out of the optical path, so long as the phase shift element can move reciprocally into and out of position between the end faces 11, 11'.

By way of example only, the core layer 52 can be rectangular, with sides running from approximately 8–40 μm thick and approximately 3–15 μm wide. More preferably, the core layer 52 is square, with sides from approximately 6–8 μm thick and approximately 6–14 μm wide. The upper and lower cladding layers 51, 49 adjacent to core layer 52 can be approximately 3–18 μm thick, and are preferably approximately 15 μm thick.

There may be diffraction of the optical signal (i.e., light beam) each time it passes between the resonator's end faces 11, 11'. Owing to this diffraction, the light beam traveling across region 9 and entering end face 11' may be somewhat larger in area than the beam of light exiting from end face 11. Consequently, it may be preferable to design the region 9, end faces 11, 11' and movable phase shift element 5 to minimize the amount of open space which the light must cross. In part, this can be done by arranging the end faces 11, 11' to be separated by a distance only slightly greater than the width $L_2$ of the phase shift element 5. These spacing concerns apply regardless of the manner in which the phase shift element tapers, and regardless of whether the phase shift element is symmetrical.

Figure 3:
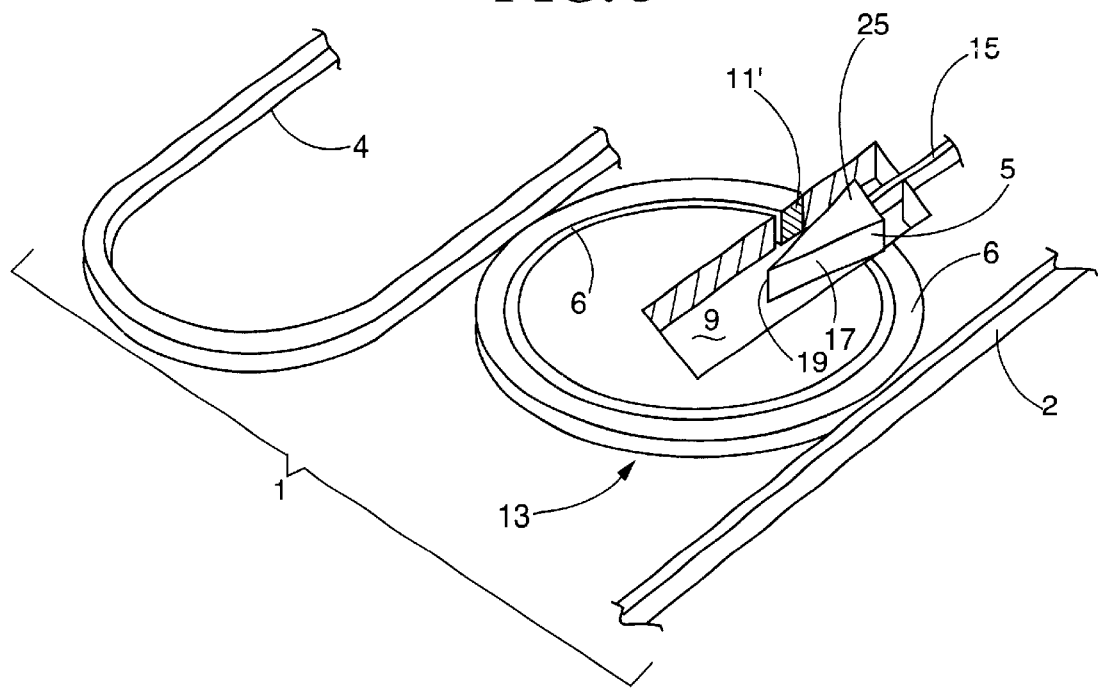
FIG. 3 is a perspective view of a portion of the optical device of FIG. 1.

The region 9 through which the phase shift element 5 moves should not be too wide or too narrow. Too wide a region 9 will result in high diffraction losses for light passing from one end face 11 to the other end face 11'. Too narrow a region 9 will make aligning the element 5 in the region 9 very difficult, and also will reduce the tunability range by reducing the maximum width (i.e., $L_2$, depicted in FIG. 5 and discussed below) of the phase shift element 5. By way of non-limiting example, the trench can be from approximately 8–40 μm wide. In an exemplary silica-based resonator, a region width $L_1$ (as depicted in FIG. 3) on the order of approximately 10 to 35 μm is preferred. Even more preferably, the trench is approximately 12–20 μm wide.

It may be possible to increase the width of the region 9 by reducing diffraction losses in the light crossing the region 9. Such losses could be reduced by providing tapers 90, 190 integrally formed as part of the waveguides 6. Alternatively, the tapers 90, 190 may be separate components attached to the waveguides 6. Moreover, only one tapers 90 could be provided in association with output waveguide 6. Light would leave input waveguide 6, pass through trench 9, and pass through taper 90 into output waveguide 6.

Figure 8A:
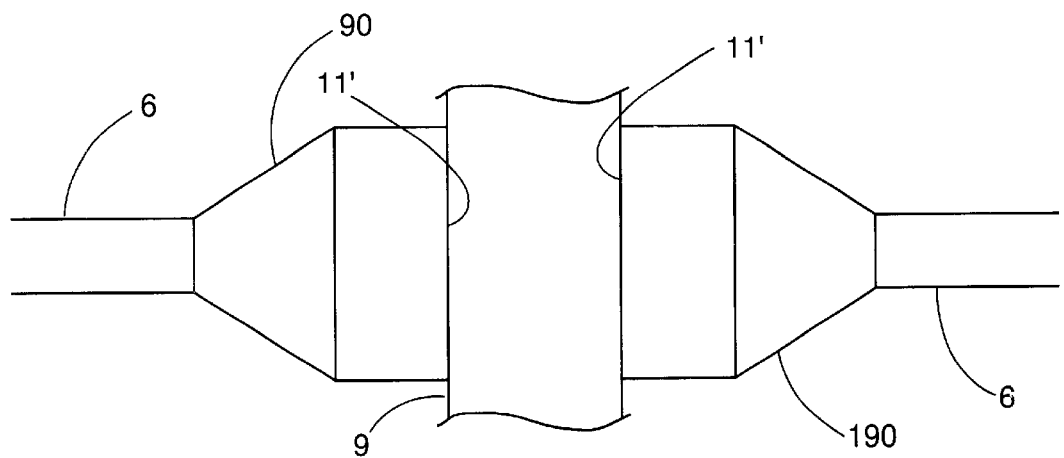
FIGS. 8A and 8B show two different ways by which light passing between waveguides can be controlled.
Figure 8B:
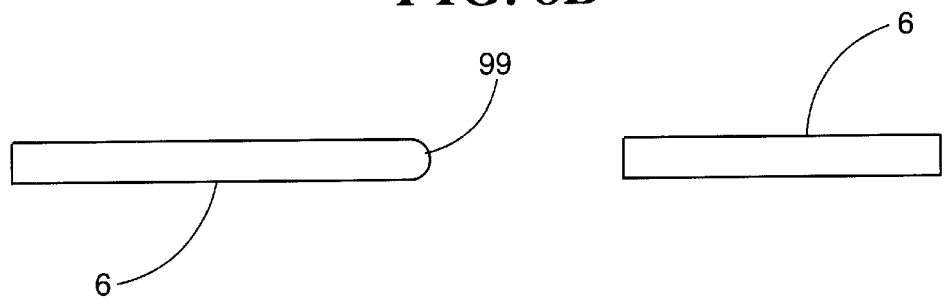

Another way to reduce diffraction losses is to provide an etched lens 99 at one of the waveguides 6 or end faces 11, 11', as shown in FIG. 8B. It is presently thought to be preferable to have lens 99 in the waveguide. Lens 99 shapes light passing from that end face before it crosses region 9. While such a lens 99 could be formed in a variety of ways, an etched lens is now thought to be preferred.

The planar phase shift element 305 is preferably rectangular and can be from approximately 1–8 μm thick, approximately 10–100 μm high, and approximately 10–100 μm long. The tapered phase shift element 105, 205 can have a length ranging from approximately 10–100 μm, a height of approximately 1–8 μm, and a width ranging from approximately submicron-size at the tip to 100 μm at the widest portion $L_2$. Both the planar and tapered phase shift elements 5, 105, 205 can be made from any sufficiently rigid and light material. Preferably, the planar phase shift element 5 is approximately 2 μm thick, approximately 30–40 μm high, and approximately 30–40 μm long. The tapered phase shift element 105, 205 is preferably triangular, has a tip width of approximately submicron size, a maximum width of 30–40 μm, and a length of approximately 30–40 μm The planar and tapered phase shift elements 5, 105, 205 are preferably made from silicon.

Again, to improve performance it is also desirable that the phase shift element 5 be made from light yet stiff material. It is preferable that the material used for the phase shift element 5 be a dielectric material, and more preferably, a lossless dielectric such as silica, silicon nitride, or any nitride.

Figure 5:
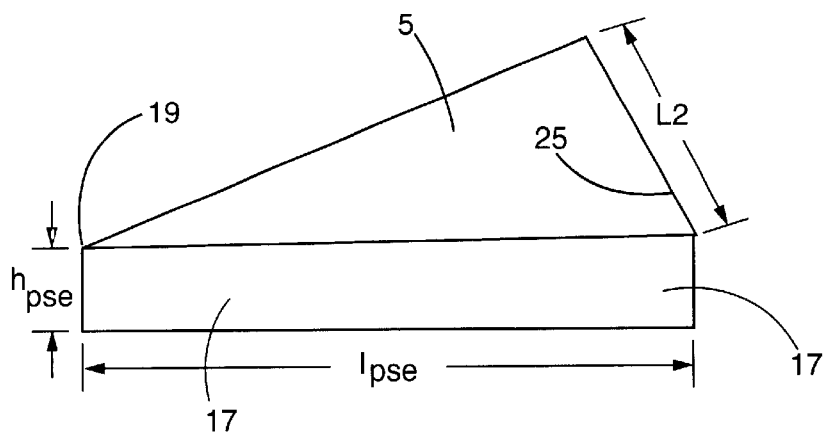
FIG. 5 is a perspective view of a tapered phase shift element constructed in accordance with an embodiment of the present invention.
Figure 6A:
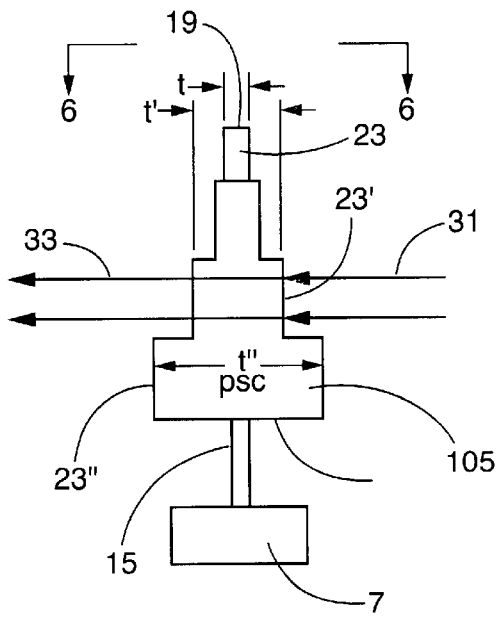
FIG. 6A is a top plan view of a stepped variable phase shift element constructed in accordance with an embodiment of the present invention.
Figure 6B:
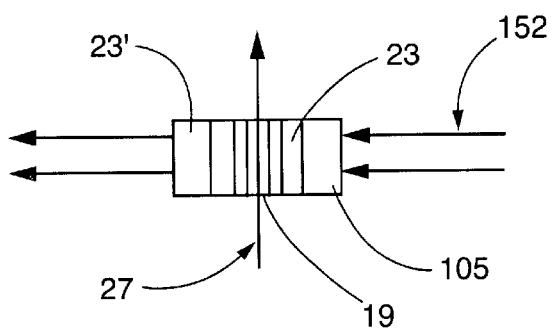
FIG. 6B is a front elevational view of the phase shift element viewed along line 6—6 of FIG. 6A.
Figure 6C:
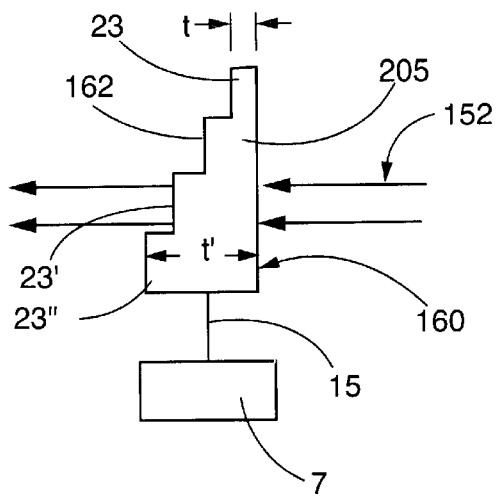

For a tapered phase shift element 5, as depicted in FIG. 5, or a stepped phase shift element 5, as depicted in FIGS. 6A, 6B and 6C, each of which provide a range of phase shifts for the resonator 13, the amount by which the phase of an optical (light) signal will be caused to shift from passing through the phase shift element 5 can vary from approximately 0° at the narrowest part of the element 5, i.e., at the tip 19, to approximately 180° (π) at some point between the tip 19 and an end 25 opposite of the tip 19. It should be noted that the maximum phase shift of approximately 180° may occur at some location along the element 5 other than near the end 25. Phase shifts of greater than approximately 180° are generally not required because such shifts are duplicative of 0–180° shifts, shifts of up to 360° (2π) could be applied, and this invention is intended to cover such shifts.

As shown in FIG. 5, a tapered phase shift element 5, is generally tapered or wedge-shaped. That shape provides a range of phase shift of the element 5 from approximately 0° at the tip 19 of the phase shift element 5 to approximately 180° (π) at some point between the tip 19 and end 25 opposite the tip 19, depending upon the position of the element 5 within the region and with respect to the end faces 11, 11'. Thus, the amount of phase shift (in angular degrees) increases moving in a direction from the tip 19 to the end 25 opposite the tip. Alternatively, the orientation of the phase shift element 5 could be reversed (not shown), so that the phase shift element's tip 19 is attached via link 15 to actuator 7. For that embodiment, consideration of the stress experienced by the tip 19, link 15, and actuator 7 may be necessary.

The variable phase shift element 5 can be generally described in terms of its amount of phase shift per unit length. For example, a π/(50 μm) (maximum amount of phase shift over element length) phase shift element would have twice the slope of a π/(100 μm) phase shift element.

Figure 2:
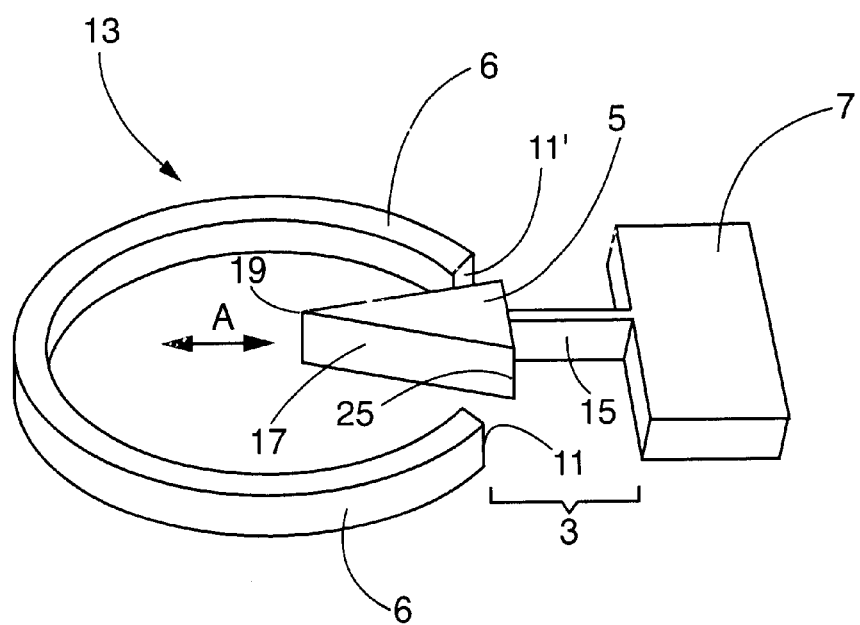
FIG. 2 is a perspective view of portions of the resonator shown in FIG. 1, certain structure surrounding the resonator having been omitted for clarity.

As shown in FIGS. 1–3, the phase shift element 5 is affixed to actuator 7 by a stiff yet light-weight link 15 and is sized and shaped so as to be reciprocally movable without interference along region 9. The actuator 7 can then be used to move the phase shift element 5 between the end faces 11, 11' and into and out of the optical path. Only while some portion of the phase shift element 5 is between end faces 11, 11' will the phase shift element 5 change the phase of light passing through the resonator 13, so as to alter the resonant wavelength of the resonator 13.

A device in accordance with the present invention can be constructed using known silica processing techniques. Use of an integral phase shift element 5 is thought to be preferred.

With continued reference to FIGS. 1–3, the optical device 1 may include an input waveguide 2 from which light may couple into the resonator 13, and an output waveguide 4 to which light may couple from the resonator 13. The shapes and orientations of the input and output waveguides 2, 4 as shown in FIGS. 1 and 3 are by way of example only; either or both of these waveguides 2, 4 can be straight or curved; nor do those waveguides 2, 4 have to be parallel to each other.

Figure 13A:
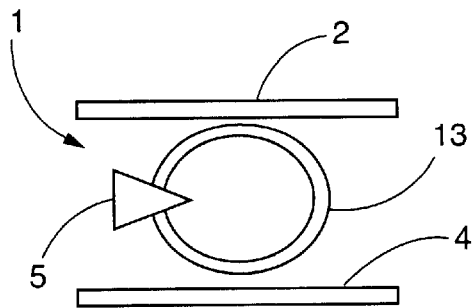
FIG. 13A depicts an optical device having an elliptical resonator constructed in accordance with an embodiment of the present invention.
Figure 13B:
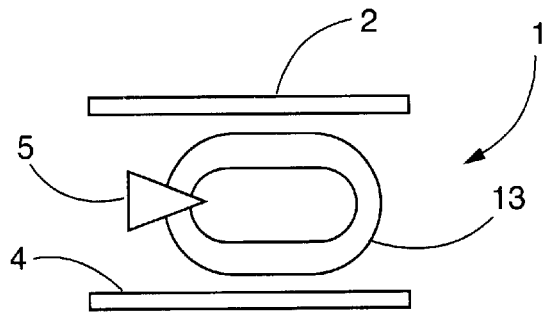
FIG. 13B depicts an optical device having a race-track resonator constructed in accordance with an embodiment of the present invention.
Figure 13C:
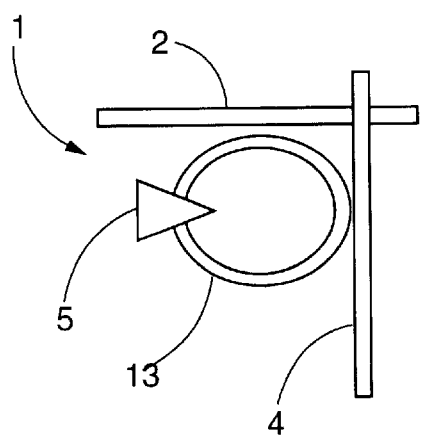
FIG. 13C depicts an optical device having perpendicular input and output waveguides constructed in accordance with an embodiment of the present invention.
Figure 13D:
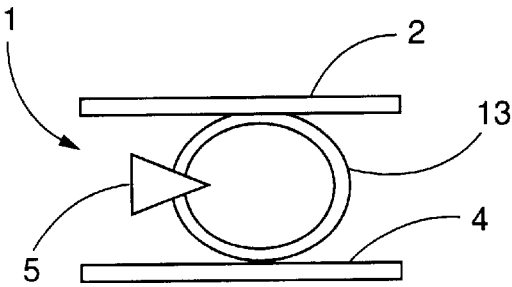
FIG. 13D depicts an optical device having a zero-gap coupling resonator constructed in accordance with an embodiment of the present invention.
Figure 13E:
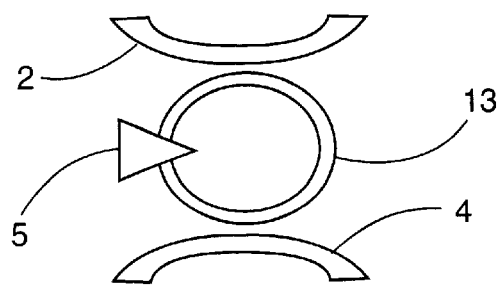
FIG. 13E depicts an optical device having a resonator having curved input and output waveguides constructed in accordance with an embodiment of the present invention.
Figure 14:
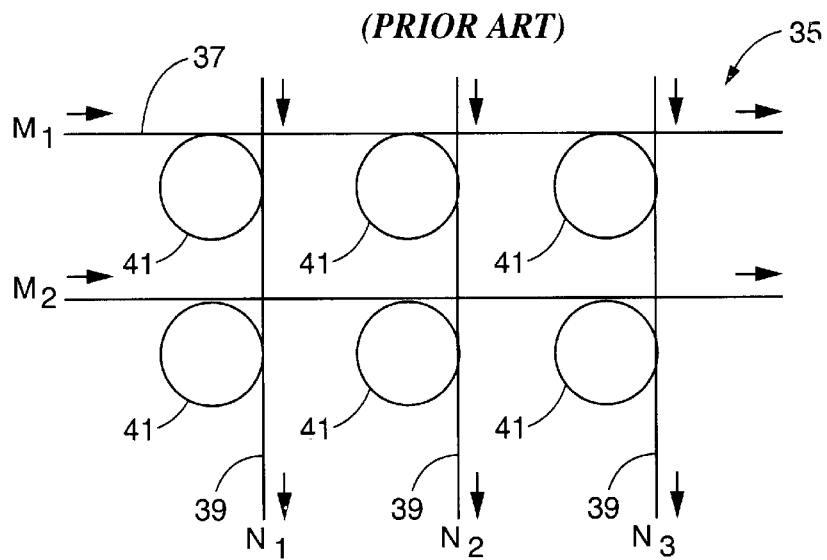
FIG. 14 is a schematic view of a M×N optical crossconnect.
Figure 15A:
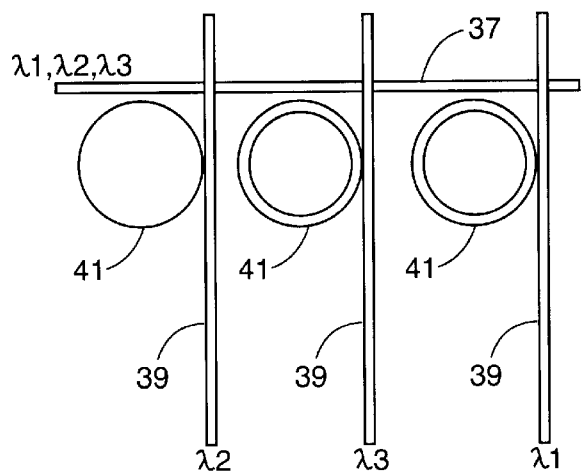
FIGS. 15A and 15B are schematic views showing two different configurations of an optical cross-connect.
Figure 15B:
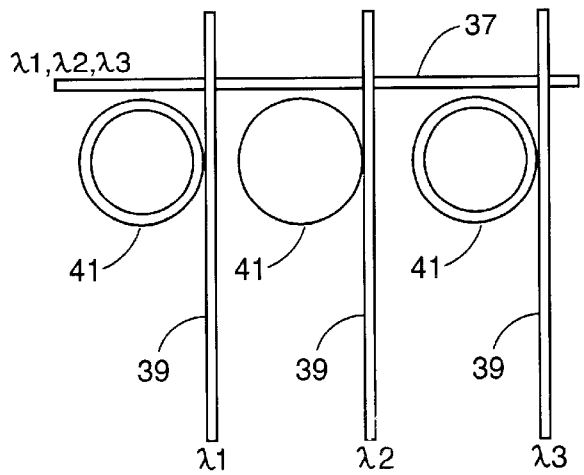
Figure 16A:
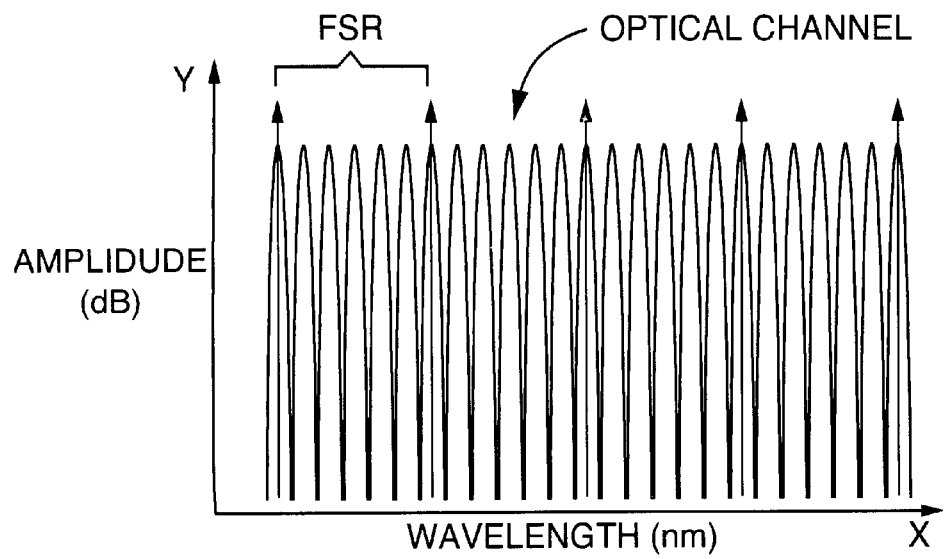
FIGS. 16A and 16B graphically depict the free spectral range of two different sized resonators constructed in accordance with the present invention.
Figure 16B:
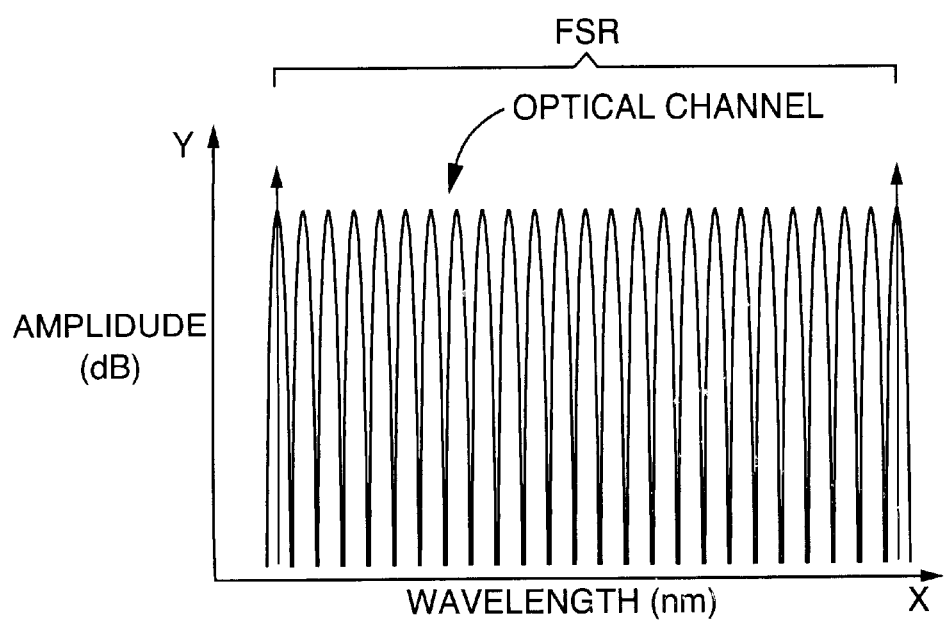

Similarly, the resonator 13 is not limited to a generally annular shape, as depicted in FIG. 1. Exemplary, non-limiting embodiments of self-feeding resonators in accordance with the present invention are depicted in FIGS. 13A–E. For example, FIG. 13A depicts an optical device 1 having an elliptical resonator 13, FIG. 13B depicts an optical device 1 having a race-track resonator 13, FIG. 13C depicts an optical device 1 having a resonator 13 having non-parallel input and output waveguides, FIG. 13D depicts an optical device 1 having a zero-gap coupling resonator 13, and FIG. 13E depicts an optical device 1 having a resonator 13 having generally arcuate input and output waveguides.

Insofar as coupling between the resonator 13 and input and output waveguides 2, 4 is concerned, the optical device 1 operates in a manner comparable to other resonators. Typically, a multi-wavelength optical signal propagates in and along the input waveguide 2. That signal may be coupled from a long-distance transmission medium such as, for example, a fiber-optic cable, from an optical source such as, for example, a laser, or other light propagating or generating devices. The optical signal is comprised of a plurality of wavelengths, each wavelength typically carrying information (e.g., data, voice, video, music, text, etc.) intended for a different destination. The resonator 13 may be selectively tuned to resonate at a desired wavelength, also referred to as the resonant wavelength of the resonator 13. When the wavelength of the optical signal propagating though the input waveguide 2 is the same as the resonator's resonant wavelength, that wavelength couples from the input waveguide 2 to resonator 13, and from the resonator 13 to the output waveguide 4.

The amount of signal coupled within the optical device 1 is generally controlled by three variables: coupling between the input waveguide 2 and the resonator 13 (generally dependent upon the gap and coupling length between the waveguide 2 and resonator 13), coupling between the resonator 13 and the output waveguide 4 (also generally dependent upon the gap and coupling length between the waveguide 4 and resonator 13), and by the losses in the resonator 13.

In an embodiment of the present invention, the phase shift element 5 is an optically transparent piece of material having specific optical qualities, in particular, a refractive index different from that of the material filling the trench 9 (in general, air). While the phase shift element 5 is preferably generally wedge-shaped, as depicted in FIG. 5, alternate embodiments include a generally rectangular shaped phase shift element 5 (see, e.g., FIG. 7) and a stepped phase shift element 5 (see, e.g., FIGS. 6A, 6B and 6C). If the phase shift element 5 index of refraction is greater than that of the material filling the trench 9 (generally air), light passing through the element 5 may experience a change in velocity and thus a corresponding change in its phase relative to light not passing through that element 5. The width and general shape of the phase shift element 5 are chosen to provide a desired amount of phase shift (in degrees, for example) or a range of phase shift. That is, since the phase shift introduced in an optical signal passing through the phase shift element 5 is a function of both the index of refraction and width of the element 5, those parameters may be selected to provide a phase shift element 5 which imparts a desired phase shift or a desired range of phase shifts. Other than inducing a phase shift, the material from which the phase shift element 5 is constructed should not significantly alter (e.g., absorb) a light which passes therethrough.

The principles of operation of a phase shifter 3 provided in accordance with embodiments of the present invention will be better understood in view of FIGS. 4A and 4B, which depict a wedge-shaped or tapered phase shift element 5 in two positions with respect to the resonator 13. As the wedge-shaped phase shift element 5 is moved into the region 9 between the two end faces 11, 11' of the resonator 13, the average index of refraction encountered by the light passing across the region 9 changes from 1 (for air, which may be provided in the region 9) when the phase shift element 5 is located entirely outside the region 9 (as depicted in FIG. 4A), to $n_{pse}$ (the refractive index of the element 5) when the tapered phase shift element 5 is completely disposed in the region 9 (as depicted in FIG. 4B). For a tapered phase shift element 5, a range of phase shifts may be provided, depending upon the width of the element 5 through which the light signal must pass. In any intermediate position (i.e., other than those depicted in FIGS. 4A and 4B), the average index of refraction of the tapered phase shift element 5 may be determined using equation 5:

$$n(X) = 1 + (n_{pse} - 1)\frac{\tan(\alpha)}{2}\frac{(W + 2X)}{L_1} \qquad (6)$$

where X represents the displacement of the tip 19 of the phase shift element 5 from the position depicted in FIG. 4A (i.e., its rest position), $\alpha$ is the taper angle of the phase shift element, $L_1$ is the width of the region 9, $n_{pse}$ is the refractive index of the element 5, and W is the width of the waveguide of the resonator 13.

The maximum achievable ring tunability (the amount by which the resonator's resonant wavelength may be changed) is expressed as:

$$\Delta\lambda = \frac{\lambda L_2(n_1 - 1)}{n_1 2\pi R + L_2(n_1 - 1)} \qquad (7)$$

Here, $n_1 = n(X_{max})$ (the position resulting in the greatest phase shift by element 5 from the position depicted in FIG. 4A) is the index of refraction when the phase shift element 5 is located as depicted in FIG. 4B, and $L_2$ is the widest width of the phase shift element 5 (which is approximately the same as the region width, $L_1$), R is the resonator radius, and $\lambda$ is the wavelength of the light passing through the resonator 13.

By way of example only, where a resonator 13 is made from a silica-based material such as, for example, $SiO_2$ (which has an index of refraction approximately equal to 1.5), the maximum width of the phase shift element 5 is approximately equal to 4 $\mu$m, and the resonator radius is approximately equal to 20 $\mu$m. Solving equation 6 leads to a value for $\Delta\mu$ of approximately 13 nm.

In contrast, a conventional resonator such as a resonator made of silica and having a radius of approximately 20 $\mu$m, if tuned using thermal effects, could have its resonant frequency varied only by about 1 nm. Consequently, it will be apparent that this invention provides a remarkably superior tunable resonator device than prior art devices.

The positions and orientations of the resonator 13 end faces 11, 11' also may have to be arranged to compensate for light refraction in the phase shift element 5, as will now be discussed. The resonator 13 depicted in FIGS. 1–3 has a wavelength tuning range larger than approximately 3 μm. That range is generally a result of the tapered shape of the phase shift element 5. End faces 11, 11' of resonator 13 are exposed within the region 9 and are generally oriented such that as light propagates through the resonator 13 along the optical path, the light leaves the resonator 13 via one end face 11, crosses the region 9, and then reenters the resonator 13 through the other end face 11'. For a tapered phase shift element 5, the sides 17 are not parallel. This may affect the light leaving the phase shift element 5.

Figure 4C:
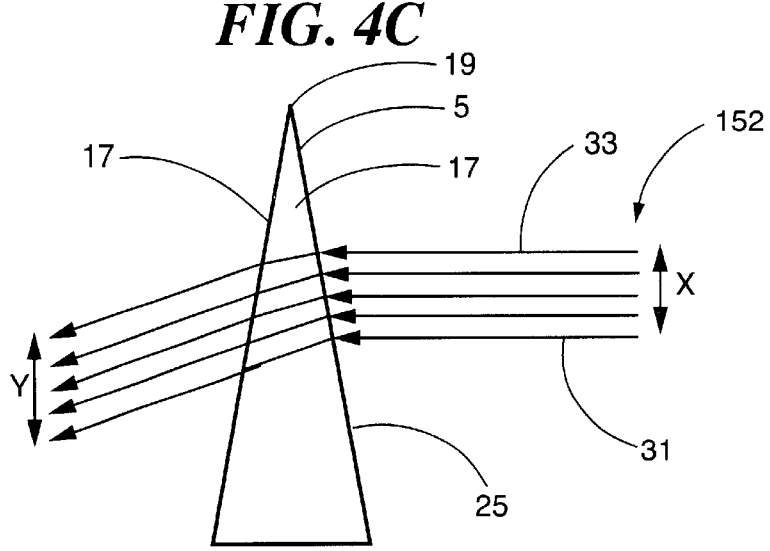
FIG. 4C is a top plan view showing light passing through a tapered phase shift element.

Referring next to FIG. 4C, the effect of a tapered phase shift element 5 on an optical signal or light beam is there depicted. Since the amount of phase shift introduced into an optical signal by the phase shift element 5 is determined, at least in part, by the thickness of the element 5, an element 5 having a variable thickness may be used to introduce a selectable, variable phase into an optical signal.

Figure 7:
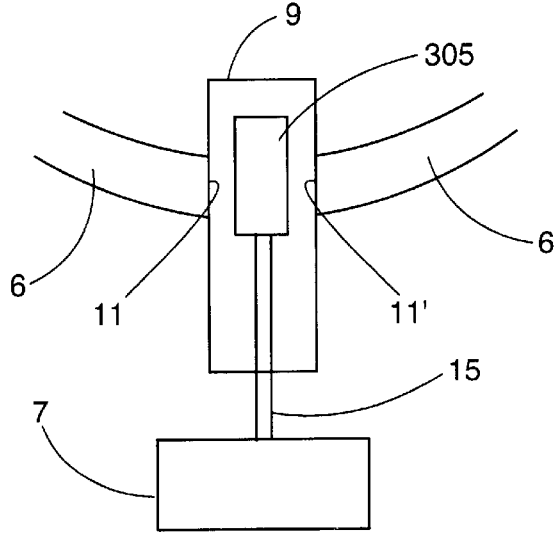
FIG. 7 is a top plan view of a phase shift element configuration constructed in accordance with an alternate embodiment of the present invention.

A tapered phase shift element 5 may require a more precise actuator 7 than a non-tapered phase shift element 5, such as depicted in FIG. 7. For a non-tapered element 5, the actuator 7 need only move the phase shift element 5 between one of two positions (into or out of position between the end faces 11, 11'). As long as the element 5 is positioned in the optical path, the desired phase shift will be introduced into the optical signal. For a tapered phase shift element 5, the actuator 7 must move the phase shift element 5 from position out of the optical path to a particular and relatively precise position so that the optical signal passes through the phase shift element 5 at a particular thickness and the desired phase shift is introduced into the optical signal. For example, consider a tapered phase shift element 5 having a $\pi/(50\ \mu m)$ (maximum phase shift amount over length, $l_{pse}$, of element 5) phase shift element 5 positioned so as to introduce a $\pi/6$ phase shift into an optical signal to change the resonance of the waveguide 6. If it is desired to change that phase shift from $\pi/6$ to $\pi/3$, it will be necessary to increase the phase shift by $\pi/6$. This will require moving the phase shift element 5 by approximately 8 μm, as shown clearly in equation (7); which may be used to calculated the amount of movement required of the element 5 for a desired phase shift.

$$\frac{(\pi/3)-(\pi/6)}{\pi/(50\ \mu m)}=8\ \mu m \quad (8)$$

It will be appreciated that such small movement requires precise control of the position of the wedge-shaped phase shift element 5.

One alternative to a more accurate actuator 7 is a more gradually sloping phase shift element 5. For example, halving the phase shift element's taper will double the distance by which the phase shift element 5 would have to be moved to cause the same magnitude phase shift. This effectively increases the accuracy of the actuator 7. For example, a phase shift element 5 having a length approximately equal to 10 μm and constructed to introduce a $\pi$ phase shift into an optical signal would have sides 17 that slope at a rate approximately twice that of a 20 μm phase shift element 5.

An alternative embodiment of a phase shift element 5 in accordance with the present invention is depicted in FIGS. 6A and 6B. The stepped phase shift element 105 consists of two or more different rectangular phase shift regions 23, 23', 23" having different thicknesses, t, t, t". Since the phase shift of light passing through each phase shift region 23, 23', 23" is a function of the phase shift region's thickness, it will be understood that thicker phase shift regions introduce a greater phase shift than thinner phase shift regions. Instead of allowing an infinite range of phase shifts from 0–180°, this arrangement provides for a discrete number of phase shifts.

The number of phase shifts possible using a stepped phase shift element 105 as depicted in FIGS. 6A and 6B will correspond to the number of phase shift regions 23, 23', 23". For example, a six-step phase shift element could provide phase shifts approximately equal to $\pi/6$, $\pi/3$, $\pi/2$, $2\pi/3$, $5\pi/6$ and $\pi$. It is not thought that more than a total of approximately ten phase shift regions 23 would be needed. When configured as depicted in FIG. 6A, or alternatively, with the smallest thickness being located near the link 15, the stepped phase shift element 105 provides monotonic phase shifting of an optical signal. Alternatively, non-monotonic phase shifting may also be provided, as a routine matter of design choice.

When viewed from one end, such as depicted in FIG. 6B, for example, the stepped phase shift element 105 can be seen to have a number of phase shift regions 23, 23', 23" all arranged symmetrically about a common center plane 27 defined through the element 105. Alternatively, the stepped phase shift element 205 may have a stepped side 162 and a flat side 160, as depicted in FIG. 6C. The flat side 160 may face either end face 11, 11'.

Individual phase shift regions 23, 23', 23" of the stepped phase shift element 105, 205 need not be arranged either symmetrically. For example, phase shift regions 23, 23', 23" could be arranged so that the most frequently used phase shift regions are adjacent to one another (not shown). This arrangement will reduce the distance by which the phase shift element 105, 205 would have to be moved to place those most used phase shift regions in the optical path. Since the phase shift element 105, 205 has to be moved a shorter distance, the phase shifter's response time would be improved.

The stepped phase shift element 105, 205 can be fabricated either as a single integral piece or an assembly of several suitably-aligned pieces adhered or bonded together. Fabricating a single integral piece may be preferable because that avoids the need to align precisely the assembled pieces, and also avoids deformations in the optical material which might be caused by the adhering or bonding of the several pieces.

Another benefit to using a stepped phase shift element 105, 205 is that a less precise actuator 7 may be needed, since the minimum distance by which the phase shift element 105, 205 will have to be shifted is approximately equal to the distance between the centers of two adjacent phase shift regions. In the case of a silica resonator 13, the beam of light may have a width on the order of 10 μm, and so the steps in the phase shift element 105, 205 could, by way of example only, be 15 μm wide. Consequently, the minimum amount by which the actuator 7 would move the phase shift element 105, 205 could be about 15 μm.

To ensure that the light beam 152 does not simultaneously encounter two different, adjacent phase shift regions, the length of each region is preferably no less than the width of the resonator waveguide (see, e.g., FIG. 4A).

Actuator 7 serves to move the phase shift element 5, 105, 205 into and out of the optical path between the ends faces 11, 11'. While any suitable type of actuator could be used to implement this invention, it is presently thought that either an electrothermal or electromechanical type actuator would be preferred. Both types of actuators are for general purposes known in the art, and so will not be described in precise detail. For the purposes of this invention, it will be appreciated that any actuator could be used which sufficiently changes its size in response to the application of energy. In some cases, as will be evident from the following discussion, large displacements of the phase shift element 5, 105, 205 may be necessary. There, electrothermal actuation may be preferred.

In another embodiment of the present invention, and with reference to FIG. 7, a generally rectangular phase shift element 305 which provides selective tuning of the resonator 13 to one of two resonant wavelengths. The resonator 13 will have one resonant wavelength when the phase shift element 305 is located in the region 9 between the ring's end faces 11, 11', and a second, different resonant wavelength when the phase shift element 305 is not located in that region 9. A resonator 13 constructed in this manner also could be made from silica, InP, GaAs, polymers, silicon nitride, silicon, etc.

Figure 10:
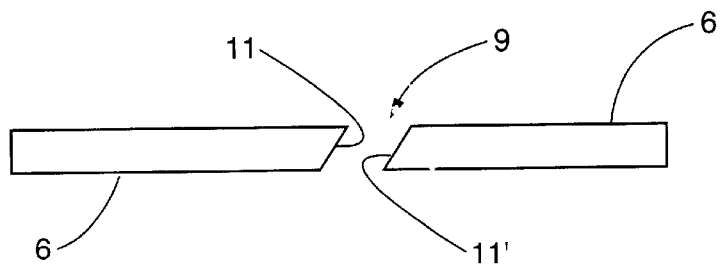
FIG. 10 is a schematic view showing a waveguide configuration which improves optical properties.

Although not a strict requirement of the invention, it may be desirable to bevel the exposed faces 11, 11' of the resonator 13 at an angle to the plane which is perpendicular to the waveguide, as depicted in FIG. 10. In an embodiment of the present invention, the end faces 11, 11' may be beveled at an angle of about 5° to 10° with respect to the optical path, and more preferably, about 6° to minimize the loss of light reflecting back into the end face 11.

The benefit to providing angled end faces 11, 11' is that it destroys the Fabry-Perot cavity that would be formed were the two facets disposed coaxially and perpendicular to one another.

Figure 9:
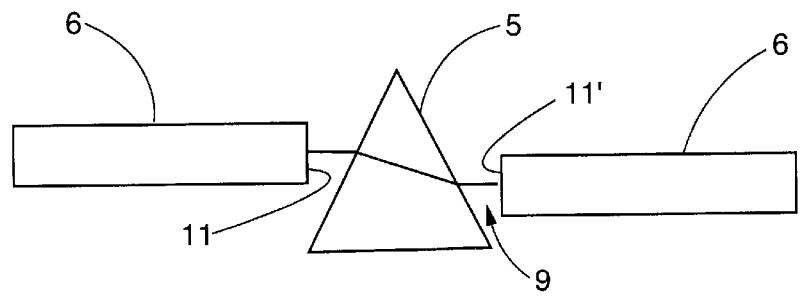
FIG. 9 is a schematic view showing light passing through a phase shift element between waveguides that have been staggered to compensate for refraction caused by the phase shift element.

A further refinement according to this invention and depicted in FIG. 9 can be used where the phase shift element 5 is tapered. When such a tapered phase shift element 5 is used in the resonator 13, light traveling along the resonator 13 and through end face 11 may, as depicted in FIG. 9, undergo a change in direction after passing through the phase shift element 5. To accommodate that directional shift, the end faces 11, 11' of resonator 13 can be offset with respect to each other. It will be appreciated that the relative positions of the end faces 11, 11' and the phase shift element 5 can be altered according to the phase shift element's shape and mounting orientation, and the width of the region 9.

Figure 12:
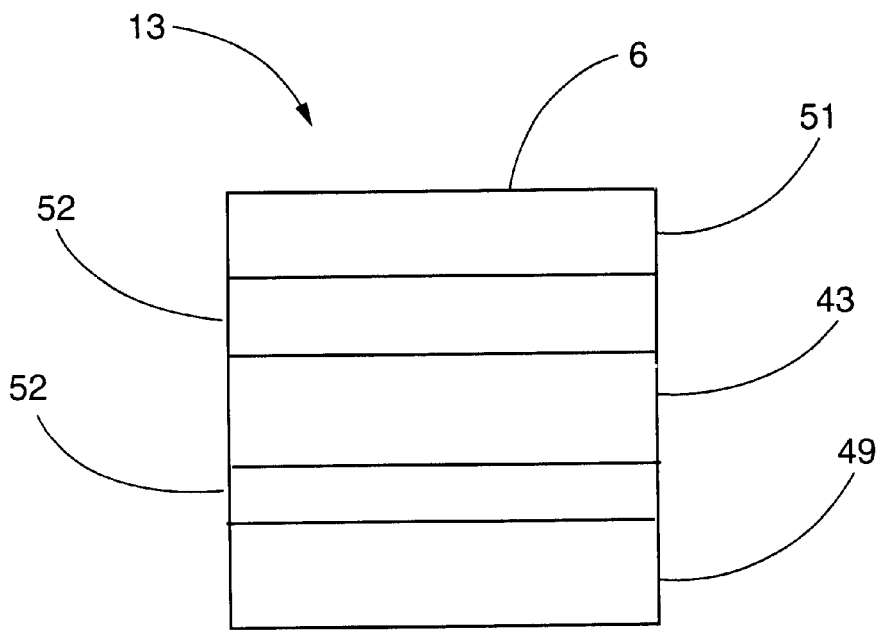
FIG. 12 is a front cross-sectional view of a portion of a resonator having a core with an active gain region in accordance with an embodiment of the present invention.

While the present invention has been described in the context of a passive resonator 13, such description has been provided in an illustrative, non-limiting manner. Thus, a resonator 13 having an active region is also contemplated by and within the scope and spirit of the present invention. Referring next to FIG. 12, a cross-sectional view of a resonator 13 waveguide 6 having a core 52 with an active region 43 which provides gain is depicted. The active region 43 may be made from a wide variety of gain-producing materials, such as silica, InP, GaAs, polymers, silicon nitride, silicon, etc. The core 52 is sandwiched between an upper cladding layer 51 and a lower cladding layer 49. The entire assembly rests upon a substrate 50. By way of non-limiting example, these layers can be made from silica, InP, GaAs, polymers, silicon nitride, silicon, etc. Substrate 50 could be made from silicon or quartz.

The present invention will work with both weakly-confined waveguides and strongly-confined waveguides. Presently, use with weakly-confined waveguides is preferred.

The present invention can be used in optical devices made from any suitable materials. While it is believed that the use of silica-based ($SiO_2$) systems is preferred for passive resonators, this invention also could be used in any other optical systems, such as those based upon gallium arsenide or indium phosphide. Group III-IV compounds could be used for active resonators. The fabrication of such optical systems is itself known.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. A tunable resonator comprising:
   a non-continuous waveguide having a resonance, the waveguide having first and second confrontingly opposite end faces between which is defined a region, a continuous optical path being defined through said waveguide, including across said region; and
   a phase shifter selectively movable in said region into and out of said optical path and introducing a phase shift in an optical signal propagating through said waveguide and along said optical path changing the resonance of the non-continuous waveguide when said phase shifter is in said optical path.

2. A tunable resonator according to claim 1, wherein said region has a bottom surface defining a plane, and wherein said phase shifter is selectively movable in a direction generally parallel with said plane.

3. A tunable resonator according to claim 1, wherein said region has a bottom surface defining a plane, and wherein said phase shifter is selectively movable in a direction generally non-parallel with said plane.

4. A tunable resonator comprising:
   a non-continuous waveguide having a resonance, the waveguide having first and second confrontingly opposite end faces between which is defined a region, a continuous optical path being defined through said waveguide, including across said region; and
   a phase shifter selectively movable in said region into and out of said optical path and introducing a phase shift in an optical signal propagating through said waveguide and along said optical path changing the resonance of the non-continuous waveguide when said phase shifter is in said optical path; the phase shifter being a phase shift element through which a phase shift may be introduced in the optical signal when said phase shift element is in said region; a link connected to an end of said phase shift element; and an actuator connected to said link such that movement of said actuator will cause movement of said phase shift element into and out of said region.

5. A tunable resonator according to claim 4, wherein said phase shift element has two substantially flat walls.

6. A tunable resonator according to claim 5, wherein said two substantially flat walls do not converge, and wherein said phase shift element introduces a predetermined and generally constant phase shift in the optical signal when said phase shift element is in said region.

7. A tunable resonator according to claim 5, wherein said two substantially flat walls converge, and wherein said phase shift element introduces a range of phase shifts in the optical signal when said phase shift element is in said region.

8. A tunable resonator according to claim 4, wherein said phase shift element has a stepped profile.

9. A method of tuning to a particular resonant wavelength an optical resonator having a non-continuous waveguide having first and second confrontingly opposite end faces between which is defined a region and having a continuous optical path defined through the waveguide, said method comprising the steps of:

providing a phase shifter in the region between the first and second end faces; and selectively positioning the phase shifter between the first and second end faces so as to introduce a phase shift in an optical signal propagating through the waveguide and along the optical path when said phase shifter is positioned between said first and second end faces.

10. A method according to claim 9, wherein the region has a bottom surface defining a plane, and wherein said positioning step comprises selectively moving the phase shifter in a direction generally parallel with the plane.

11. A method according to claim 9, wherein the region has a bottom surface defining a plane, and wherein said positioning step comprises selectively moving the phase shifter in a direction generally non-parallel with the plane.

12. A method of tuning to a particular resonant wavelength an optical resonator having a non-continuous waveguide having first and second confrontingly opposite end faces between which is defined a region and having a continuous optical path defined through the waveguide, said method comprising the steps of:

providing a phase shifter in the region between the first and second end faces; by providing a phase shift element through which a phase shift may be introduced in the optical signal when the phase shift element is in the region;

providing a link connected to an end of the phase shift element;

providing an actuator connected to the link such that movement of the actuator will cause movement of the phase shift element into and out of the region; and positioning the phase shifter so as to introduce a phase shift in an optical signal propagating through the waveguide and along the optical path.

13. A method according to claim 12, wherein the phase shift element has two substantially flat walls.

14. A method according to claim 13, wherein the two substantially flat walls do not converge, and wherein the phase shift element introduces a predetermined and generally constant phase shift in the optical signal when the phase shift element is in the region.

15. A method according to claim 13, wherein the two substantially flat walls converge, and wherein the phase shift element introduces a range of phase shifts in the optical signal when the phase shift element is in the region.

16. A method according to claim 12, wherein the phase shift element has a stepped profile.

* * * * *